US010129837B2

United States Patent
Cook et al.

(10) Patent No.: US 10,129,837 B2
(45) Date of Patent: Nov. 13, 2018

(54) VARIABLE CAPACITOR

(71) Applicant: SKYWORKS SOLUTIONS, INC., Woburn, MA (US)

(72) Inventors: Mackenzie Brian Cook, Montreal (CA); John William Mitchell Rogers, Nepean (CA)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 15/379,475

(22) Filed: Dec. 14, 2016

(65) Prior Publication Data

US 2017/0170822 A1 Jun. 15, 2017

Related U.S. Application Data

(60) Provisional application No. 62/266,869, filed on Dec. 14, 2015.

(51) Int. Cl.
*H04B 1/40* (2015.01)
*H04W 52/52* (2009.01)
*H01G 5/38* (2006.01)
*H01L 27/24* (2006.01)
*H01G 4/40* (2006.01)

(52) U.S. Cl.
CPC ............. *H04W 52/52* (2013.01); *H01G 5/38* (2013.01); *H01L 27/24* (2013.01); *H01G 4/40* (2013.01)

(58) Field of Classification Search
CPC .. H03B 5/1265; H03B 5/1228; H03B 5/1215; H03B 5/1212; H03B 2201/0266; H03B 5/124; H03B 5/1268; H03K 17/687; H03K 17/693; H03K 2217/0054; H03K 17/04123; H03K 17/04206; H03K 17/102; H03K 17/14
USPC ......... 375/254–259, 219–220, 288, 297, 312
See application file for complete search history.

(56) References Cited

U.S. PATENT DOCUMENTS

| | | | | |
|---|---|---|---|---|
| 7,116,183 B2* | 10/2006 | Wu | ............... | H03B 5/04 |
| | | | | 331/117 FE |
| 7,129,801 B2* | 10/2006 | Wu | ............... | H03L 7/099 |
| | | | | 331/117 FE |
| 7,230,504 B1* | 6/2007 | Marques | ........... | H03B 5/1228 |
| | | | | 331/117 FE |
| 7,463,097 B2* | 12/2008 | Costa | ............... | H03L 1/026 |
| | | | | 331/14 |
| 8,067,995 B2* | 11/2011 | Tsukizawa | ........... | H03B 5/1228 |
| | | | | 331/117 FE |
| 8,547,157 B1* | 10/2013 | Mangold | ......... | H03K 17/04123 |
| | | | | 327/308 |
| 8,884,816 B2* | 11/2014 | Huang | ............... | G01S 19/235 |
| | | | | 342/357.62 |
| 9,356,557 B1* | 5/2016 | Gao | ............... | H03L 3/00 |
| 2003/0227341 A1* | 12/2003 | Sawada | ............... | H03B 5/1228 |
| | | | | 331/177 V |
| 2005/0040889 A1* | 2/2005 | Tsuchi | ............... | H03F 3/3022 |
| | | | | 330/255 |

(Continued)

*Primary Examiner* — Emmanuel Bayard
(74) *Attorney, Agent, or Firm* — Chang & Hale LLP (57) ABSTRACT

A variable capacitor is disclosed, having a variable capacitance between a first node and a second node. The variable capacitor comprises a switch having a first terminal and a second terminal, the impedance between the first terminal and the second terminal being controllable via a control node. The variable capacitor further includes a first capacitor coupled between the first terminal and the first node, and a second capacitor coupled between the second terminal and the second node.

20 Claims, 7 Drawing Sheets

(56) References Cited

U.S. PATENT DOCUMENTS

| | | | |
|---|---|---|---|
| 2005/0151576 A1* | 7/2005 | Lee | H03H 11/245 327/334 |
| 2005/0197085 A1* | 9/2005 | Tsukizawa | H03B 5/1228 455/264 |
| 2006/0208806 A1* | 9/2006 | Chien | H03L 7/099 331/16 |
| 2007/0018720 A1* | 1/2007 | Wright | H03F 1/0244 330/51 |
| 2008/0174379 A1* | 7/2008 | Chen | H03B 5/1228 331/177 V |
| 2008/0238383 A1* | 10/2008 | Watanabe | H02M 1/32 323/271 |
| 2008/0272824 A1* | 11/2008 | Fu | H03K 17/145 327/390 |
| 2008/0309413 A1* | 12/2008 | Igarashi | H03F 1/22 330/284 |
| 2012/0081188 A1* | 4/2012 | Liu | H03L 1/023 331/179 |
| 2013/0100173 A1* | 4/2013 | Chaji | G09G 5/10 345/690 |
| 2013/0223135 A1* | 8/2013 | Koyama | G11C 11/412 365/149 |
| 2013/0257558 A1* | 10/2013 | Kim | H03H 11/28 333/32 |
| 2014/0055191 A1* | 2/2014 | Kim | H03K 17/687 327/427 |
| 2014/0266481 A1* | 9/2014 | Shanan | H03B 5/1265 331/117 FE |
| 2014/0340137 A1* | 11/2014 | Keane | H03K 17/6872 327/434 |
| 2015/0015346 A1* | 1/2015 | Jou | H03J 5/246 334/55 |
| 2015/0109072 A1* | 4/2015 | Bakalski | H03J 3/20 333/174 |
| 2016/0065225 A1* | 3/2016 | Pavao-Moreira | H03L 7/099 331/16 |
| 2017/0104469 A1* | 4/2017 | Mavretic | G01R 19/165 |
| 2017/0187368 A1* | 6/2017 | Thomas | H03J 5/244 |

* cited by examiner

VARIABLE CAPACITOR

CROSS-REFERENCE TO RELATED APPLICATION(S)

This application claims priority to U.S. Application No. 62/266,869 filed Dec. 14, 2015 and entitled VARIABLE CAPACITOR, the disclosure of which is hereby expressly incorporated by reference herein in its entirety.

BACKGROUND

Field

The present disclosure relates to circuits and modules for providing a variable capacitance in components of wireless devices, particularly involving radio-frequency (RF) signals.

Description of the Related Art

Many components in wireless devices require a change in capacitance for a given circuit, as well as precise control over this change and high linearity in order to effectively work with RF signals. For example, parasitics involved in the use of a MOS varactor as a variable capacitor make this approach undesirable for sensitive RF circuits. Additionally, this approach relies on varying a voltage across the device to change the capacitance of the device. A varactor by nature is limited to a particular Cmax, which may be less than the required maximum capacitance of a given circuit.

SUMMARY

In some implementations, the present disclosure relates to a variable capacitor having a variable capacitance between a first node and a second node. The variable capacitor comprises a switch having a first terminal and a second terminal, the impedance between the first terminal and the second terminal being controlled via a control node. The variable capacitor further comprises a first capacitor coupled between the first terminal and the first node, and a second capacitor coupled between the second terminal and the second node.

In some embodiments, the switch includes a transistor having a source coupled to the first terminal and a drain coupled to the second terminal.

In some embodiments, the control node is coupled to a gate of the transistor. In some embodiments, the control node is coupled to the gate via a first resistor. In some embodiments, the control node is coupled to the source and the drain via an inverter.

In some embodiments, the control node is coupled to the source via a second resistor and is coupled to the drain via a third resistor.

In some embodiments, the transistor includes a field-effect transistor (FET).

In some embodiments, a maximum capacitance of the variable capacitor is at least six times a minimum capacitance of the variable capacitor. In some embodiments, a first capacitance of the first capacitor is substantially equal to a second capacitance of the second capacitor.

In some embodiments, the variable capacitor further comprises an offset capacitor coupled between the first node and the second node. In some embodiments, the variable capacitor further comprises a second switch having a third terminal and a fourth terminal, the impedance between the third terminal and the fourth terminal being controllable via a second control node. The variable capacitor further comprises a third capacitor coupled between the third terminal and the first node and a fourth capacitor coupled between the fourth terminal and the second node.

In some embodiments, the variable capacitance is a substantially linear function of a control word applied to the first control node and second control node.

In some embodiments, the switch has a first impedance in an on state in response to a high voltage at the control node and a second impedance in an off state in response to a low voltage at the control node, the first impedance being substantially resistive and the second impedance being substantially a parasitic capacitance.

In some embodiments, the switch, first capacitor, and second capacitor are implemented on a single die.

In some embodiments, the present disclosure relates to a variable capacitor module comprising a packaging substrate configured to receive a plurality of components, and a variable capacitor implemented on the packaging substrate, the variable capacitor having a variable capacitance between a first node and a second node, the variable capacitor including a switch having a first terminal and a second terminal, the impedance between the first terminal and the second terminal being controllable via a control node, the variable capacitor further including a first capacitor coupled between the first terminal and the first node and a second capacitor coupled between the second terminal and the second node.

In some embodiments, the variable capacitor module is a symmetric module with respect to the first node and the second node.

In some embodiments, the present disclosure relates to an integrated circuit comprising a first node and a second node, the integrated circuit having a variable capacitance between the first node and the second node, one or more control nodes, the variable capacitance being a function of a control word applied to the one or more control nodes, one or more switches respectively controllable via the one or more control nodes, and one or more capacitor pairs respectively associated with the one or more switches, each one of the one or more capacitor pairs having a first capacitor on a first switch of the associated switch and a second capacitor on a second side of the associated switch.

In some embodiments, the variable capacitance is a substantially linear function of the control word.

In some embodiments, the integrated circuit further comprises a supply node configured to receive a supply voltage.

In some embodiments, the present disclosure relates to a wireless device comprising a transceiver configured to generate a radio-frequency (RF) signal and a front-end module (FEM) in communication with the transceiver. In some embodiments the FEM includes a packaging substrate configured to receive a plurality of components, and the FEM further includes a variable capacitor implemented on the packaging substrate. In some embodiments, the variable capacitor has a variable capacitance between a first node and a second node, the variable capacitor includes a switch having a first terminal and a second terminal, the impedance between the first terminal and the second terminal being controllable via a control node, and the variable capacitor further includes a first capacitor coupled between the first terminal and the first node and a second capacitor coupled between the second terminal and the second node. In some embodiments, the wireless device further includes an antenna in communication with the FEM, the antenna configured to transmit an amplified version of the RF signal received from the transmitter system.

In some embodiments, the wireless device comprises a controller configured to control the switch.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
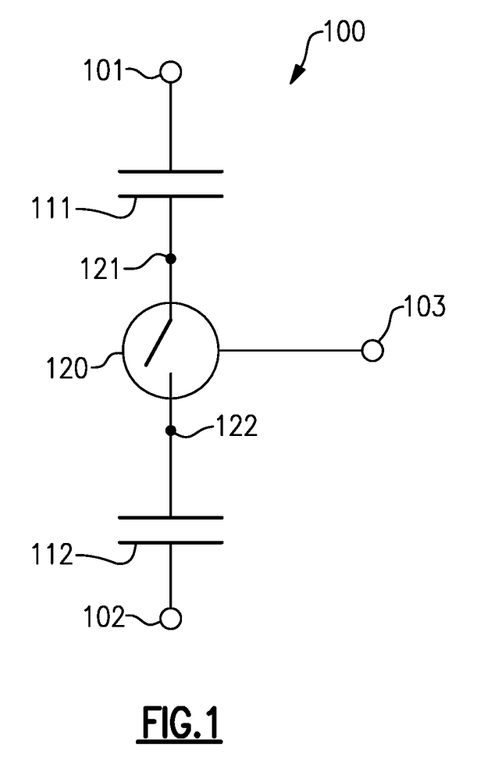
FIG. 1 shows a circuit diagram of an example variable capacitor, in accordance with some implementations.

FIG. 1 shows a circuit diagram of an example variable capacitor 100 that includes a switch 120 disposed between two capacitors 111, 112. The variable capacitor 100 includes a first node 101, a second node 102, and a control node 103. The variable capacitor 100 has a variable capacitance between the first node 101 and the second node 102 that varies according to the voltage applied to a control node 103.

The switch 120 has a first terminal 121 and a second terminal 122. The impedance of the switch 120 changes according to the voltage applied to the control node 103 (and to a control terminal of the switch). In a closed state (in response to a first voltage applied to the control node 103, e.g., a low voltage such as approximately 0 volts in the case of pMOS FET transistor), the switch 120 acts as an electrical short with a parasitic resistance. In an open state (in response to a second voltage applied to the control node 103, e.g., a high voltage such as approximately 5 volts in the case of pMOS FET transistor), the switch 120 acts as an electrical open with a parasitic capacitance.

Figure 2A:
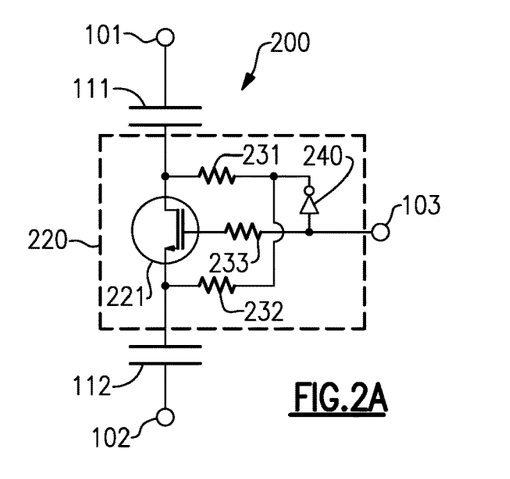
FIG. 2A shows a circuit diagram of an example variable capacitor that includes a transistor as part of a switch disposed between two capacitors, in accordance with some implementations.

FIG. 2A shows a circuit diagram of an example variable capacitor 200 that includes a transistor 221 as part of a switch 220 disposed between two capacitors 111, 112. The variable capacitor 200 includes a first node 101, a second node 102, and a control node 103. The variable capacitor 200 has a variable capacitance between the first node 101 and the second node 102 that varies according to the voltage applied to a control node 103.

The switch 220 includes a transistor 221 having a source, gate, and drain. The transistor 221 can be, for example, an nMOS transistor. In some embodiments, the transistor 221 can be other types of transistors, such as a BJT transistor or other types of FET transistors.

The first capacitor 111 is disposed between the source of the transistor 221 and the first node 101. The second capacitor 112 is disposed between the drain of the transistor 221 and the second node 102. The gate of the transistor 221 is coupled to the control node 103 via a resistor 233. The resistor 233 may be of very high resistance, e.g., 10 kΩ of more, such that, at the frequency of interest, the resistor 233 acts as an open circuit.

The source and drain of the transistor 221 are coupled to the control node 103 via respective resistors 231, 232 and an inverter 240. The resistors 231, 232 may be of a very high resistance, e.g., 10 kΩ of more, such that, at the frequency of interest, the resistor 231, 232 act as an open circuit. Thus, the gate and channel of the transistor 221 are cross-biased or inverse biased. In particular, the source and drain of the transistor 221 are each biased at opposite logic levels than the gate of the transistor 221. The DC voltage levels at the source and drain of the transistor 221 are isolated from circuitry coupled to the first node 101 and second node 102 by the first capacitor 111 and the second capacitor 112.

Figure 2B:
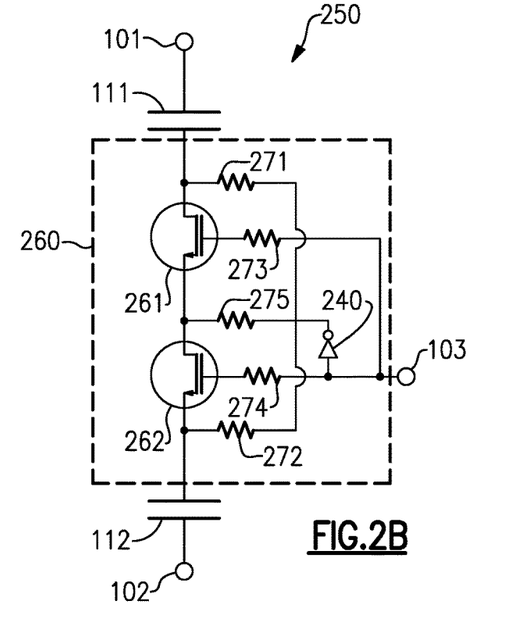
FIG. 2B shows a circuit diagram of an example variable capacitor that includes multiple transistors as part of a switch disposed between two capacitors, in accordance with some implementations.

FIG. 2B shows a circuit diagram of an example variable capacitor 250 that includes multiple transistors 261, 262 as part of a switch 260 disposed between two capacitors 111, 112. The variable capacitor 250 includes a first node 101, a second node 102, and a control node 103. The variable capacitor 250 has a variable capacitance between the first node 101 and the second node 102 that varies according to the voltage applied to a control node 103.

The first capacitor 111 is disposed between the source of the first transistor 261 and the first node 101. The second capacitor 112 is disposed between the drain of a second transistor 262 and the second node 102. The gate of the each of the transistor 261, 262 is coupled to the control node 103 via respective resistors 273, 274. The drain of the first transistor 261 is coupled to the source of the second transistor 262. The source and drain of each transistor 261, 262 are coupled to the control node 103 via respective resistors 271, 272, 275 and an inverter 240.

Figure 3A:
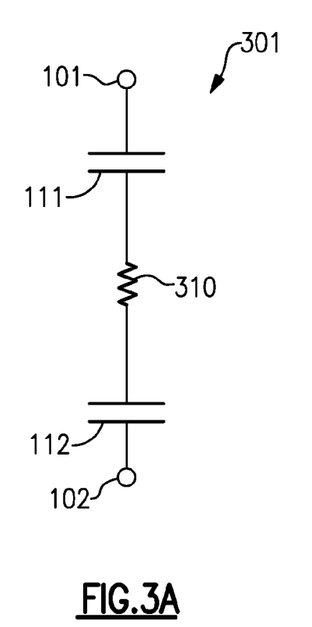
FIG. 3A shows a circuit diagram of the variable capacitor of FIG. 1 in an on state, in accordance with some implementations.
Figure 3B:
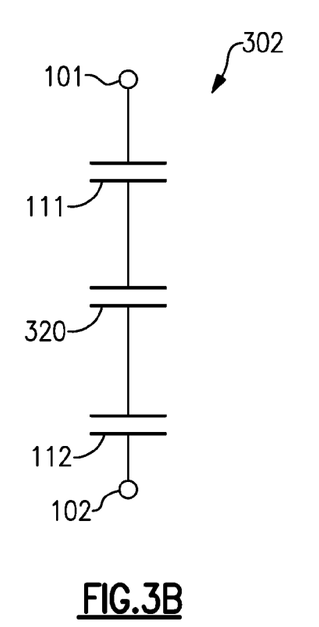
FIG. 3B shows a circuit diagram of the variable capacitor of FIG. 1 in an off state, in accordance with some implementations.

FIGS. 3A and 3B show equivalent circuit diagrams of the variable capacitor 100 of FIG. 1 in an on state and an off state, respectively. In the on state, shown in FIG. 3A, the switch acts as a parasitic resistance 310 and the variable capacitance of the variable capacitor 301 is the capacitance of the first capacitor 111 and second capacitor 112 in series. In particular, the variable capacitance, $C_V$, is approximately equal to the inverse of the sum of the inverse of the capacitance of the first capacitor, $C_1$, and the inverse of the capacitance of the second capacitor, $C_2$. Thus, $C_{Von}=(1/C_1+1/C_2)^{-1}$. In some embodiments, the capacitance of the first capacitor 111 is approximately equal to the capacitance of the second capacitor 112. Thus, $C_{Von}=C_1/2$.

In the off state, shown in FIG. 3B, the switch acts as a parasitic capacitance 320 and the variable capacitance of the variable capacitor 302 is the capacitance of the first capacitor 111, second capacitor 112, and parasitic capacitance 320 in series. In particular, the variable capacitance, $C_{Voff}$, is approximately equal to the inverse of the sum of the inverse of the capacitance of the first capacitor, $C_1$, the inverse of the capacitance of the second capacitor, $C_2$, and the inverse of the parasitic capacitance, $C_P$. Thus, $C_{Voff}=(1/C_1+1/C_2+1/C_P)^{-1}$. In some embodiments, the parasitic capacitance is caused by the capacitance between the gate and source of a transistor, $C_{gs}$, and the capacitance between the gate and drain of the transistor, $C_{gd}$. Thus, in some embodiments, $C_V=(1/C_1+1/C_2+1/C_{gs}+1/C_{gd})^{-1}$. In some embodiments, the gate-source capacitance and gate-drain capacitance are equal. Thus, in some embodiments, $C_{Voff}=(1/C_1+1/C_2+2/C_{gs})^{-1}$. In some embodiments, the capacitance of the first capacitor 111 is approximately equal to the capacitance of the second capacitor 112. Thus, $C_{Voff}=(2/C_1+2/C_{gs})^{-1}$.

Because the parasitic capacitance is small, in some embodiments, the ratio of the maximum capacitance ($C_{Von}$) to the minimum capacitance ($C_{Voff}$) is six or greater. The parasitic capacitance may be smaller (and the ratio higher) in cases when multiple transistors are used in series, e.g., as in FIG. 2B.

Figure 4:
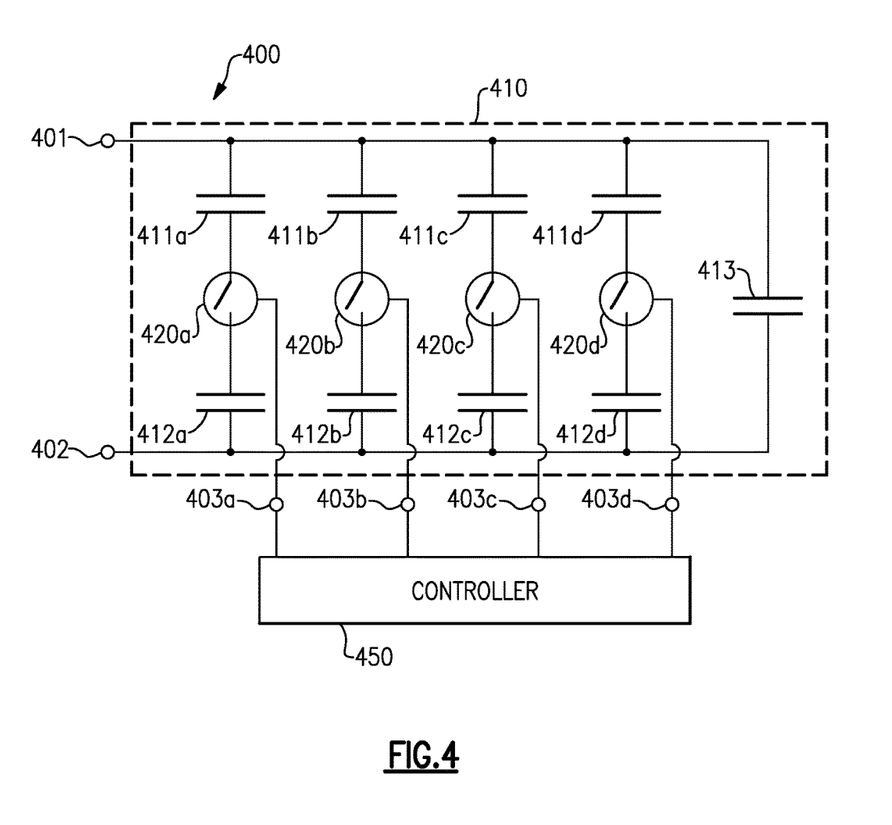
FIG. 4 shows a circuit diagram of an example variable capacitor configuration that includes multiple variable capacitance elements in parallel, in accordance with some implementations.

FIG. 4 shows a circuit diagram of an example variable capacitor configuration 400 that includes multiple variable capacitance elements in parallel. The variable capacitor configuration 400 includes a variable capacitor 410 and a controller 450. The variable capacitor 410 includes a plurality of variable capacitance elements of the type shown in FIG. 1 connected in parallel. In some embodiments, the variable capacitor 410 further includes an optional offset capacitor 413 connected in parallel. In some embodiments, the variable capacitor 410 does not include offset capacitor 413.

The variable capacitor 410, which may be implemented as an integrated circuit on a single die, has a first node 401, a second node 402, and a plurality of control nodes 403a-403d. The variable capacitor 410 has a variable capacitance between the first node 401 and the second node 402 that varies according to a control word applied to the control nodes 403a-403d by the controller 450.

Each of the variable capacitance elements includes a switch 420a-420d disposed between a respective first capacitor 411a-411d and a respective second capacitor 412a-412d. In some implementations, the capacitance of each first capacitor 411a-411d is substantially equal to the capacitance of the corresponding respective second capacitor 412a-412d. For example, the capacitance of first capacitor 411a is substantially equal to the capacitance of second capacitor 412a. In some implementations, the capacitance of each first capacitor 411a-411d is not equal to the capacitance of the corresponding respective second capacitor 412a-412d. In some implementations, a respective first capacitor (e.g., 411b) of a parallel branch of the variable capacitor 410 is substantially equal to the capacitance of a corresponding respective second capacitor (e.g., 412b), but is not equal to the capacitance of another first capacitor (e.g., 411c) of variable capacitor 410. In other words, in some implementations, the variable capacitance of a respective parallel branch differs from the variable capacitance of another parallel branch of the variable capacitor 410.

The maximum capacitance of the variable capacitor 410, denoted $C_{max}$, may be many times the minimum capacitance of the variable capacitor 410, denoted $C_{min}$. For example, the maximum capacitance may be at least six times the minimum capacitance. The minimum capacitance can be increased (and the ratio of the maximum capacitance to the minimum capacitance decreased) by increasing the capacitance of the offset capacitor 413.

The maximum capacitance of the variable capacitor 410 is approximately equal to the sum of the maximum capacitances of the variable capacitance elements, denoted $C_{on-a}$ through $C_{on-d}$, and the capacitance of the offset capacitor 413, denoted $C_{offset}$. Thus, $C_{max}=C_{on-a}+C_{on-b}+C_{on-c}+C_{on-d}+C_{offset}$. Similarly, the minimum capacitance of the variable capacitor 410 is approximately equal to the sum of the minimum capacitances of the variable capacitance elements, denoted $C_{off-a}$ through $C_{off-d}$, and the capacitance of the offset capacitor 413. Thus, $C_{min}=C_{off-a}+C_{off-b}+C_{off-c}+C_{off-d}+C_{offset}$. The capacitance of the variable capacitor 410 can changed to various values between $C_{min}$ and $C_{max}$ by turning on or off various variable capacitance elements. For example, the capacitance of the variable capacitor 410 can be set to $C_{off-a}+C_{on-b}+C_{on-c}+C_{off-d}+C_{offset}$ by turning off the first and final variable capacitance elements and turning on the middle variable capacitance elements. In general, $$C = C_{min} + \sum_n a_n(C_{on-n} - C_{off-n}) = C_{min} + \sum_n a_n \Delta C_n,$$

wherein $a_n$ represents the bits of the control word. By selecting $\Delta C_n$ for each variable capacitance element to be twice that of the previous variable capacitance element in a binary fashion, the capacitance of the variable capacitor 410 can be a substantially linear function of the control word.

FIG. 4 illustrates the implementation of four parallel capacitance branches in variable transistor 410, however any number of parallel branches can be implemented in a variable capacitor as described in this disclosure.

Figure 5:
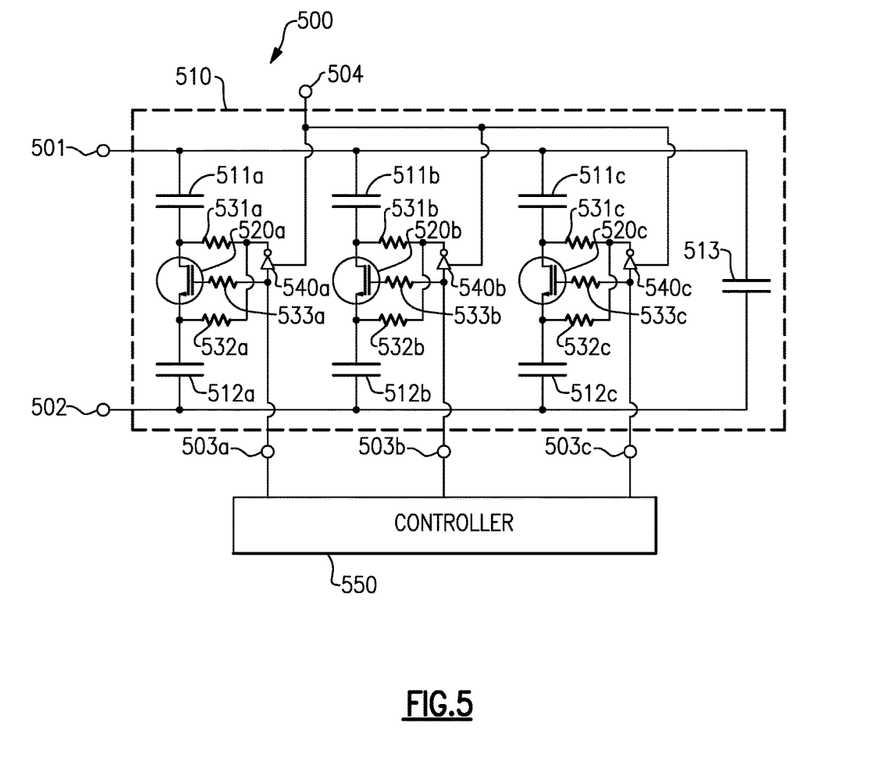
FIG. 5 shows a circuit diagram of an example variable capacitor configuration that includes multiple variable capacitance elements and transistors in parallel, in accordance with some implementations.

FIG. 5 shows a circuit diagram of an example variable capacitor configuration 500 that includes multiple variable capacitance elements in parallel including transistors. The variable capacitor configuration 500 includes a variable capacitor 510 and a controller 550. The variable capacitor 510 includes a plurality of variable capacitance elements of the type shown in FIG. 2A connected in parallel. In some embodiments, the variable capacitor 510 further includes an optional offset capacitor 513 connected in parallel. In some embodiments, optional offset capacitor 513 provides a minimum capacitance value for variable capacitor 510. For example, a particular circuit may require a minimum capacitance value higher than the capacitance derived from the parallel variable capacitance elements.

The variable capacitor 510, which may be implemented as an integrated circuit on a single die, has a first node 501, a second node 502, a plurality of control nodes 503a-503c, and a supply node 504 for receiving a supply voltage that powers the inverters 540a-540c. The variable capacitor 510 has a variable capacitance between the first node 501 and the second node 502 that varies according to the control word applied to the control nodes 503a-503c by the controller 550.

Each of the variable capacitance elements includes a transistor 520a-520c disposed between a respective first capacitor 511a-511c and a respective second capacitor 512a-512c. In particular, each first capacitor 511a-511c is disposed between the first node 501 and the source of a respective transistor 520a-520c and each second capacitor 512a-512c is disposed between the second node 502 and the drain of the respective transistor 520a-520c. Each control node 503a-503c is coupled to the gate of a respective transistor 520a-520c via a resistor 533a-533c and to the source and drain of the respective transistor 520a-520c via a respective inverter 540a-540c and resistors 531a-531c, 532a-532c.

In some implementations, the capacitance of each first capacitor 511a-511d is substantially equal to the capacitance of the corresponding respective second capacitor 512a-512d. For example, the capacitance of first capacitor 511a is substantially equal to the capacitance of second capacitor 512a. In some implementations, the capacitance of each first capacitor 511a-511d is not equal to the capacitance of the corresponding respective second capacitor 512a-512d. In some implementations, a respective first capacitor (e.g., 511b) of a parallel branch of the variable capacitor 510 is substantially equal to the capacitance of a corresponding respective second capacitor (e.g., 512b), but is not equal to the capacitance of another first capacitor (e.g., 511c) of variable capacitor 510. In other words, in some implementations, the variable capacitance of a respective parallel branch differs from the variable capacitance of another parallel branch of the variable capacitor 510.

FIG. 5 illustrates the implementation of three parallel capacitance branches in variable transistor 510, however any number of parallel branches can be implemented in a variable capacitor as described in this disclosure.

Figure 6:
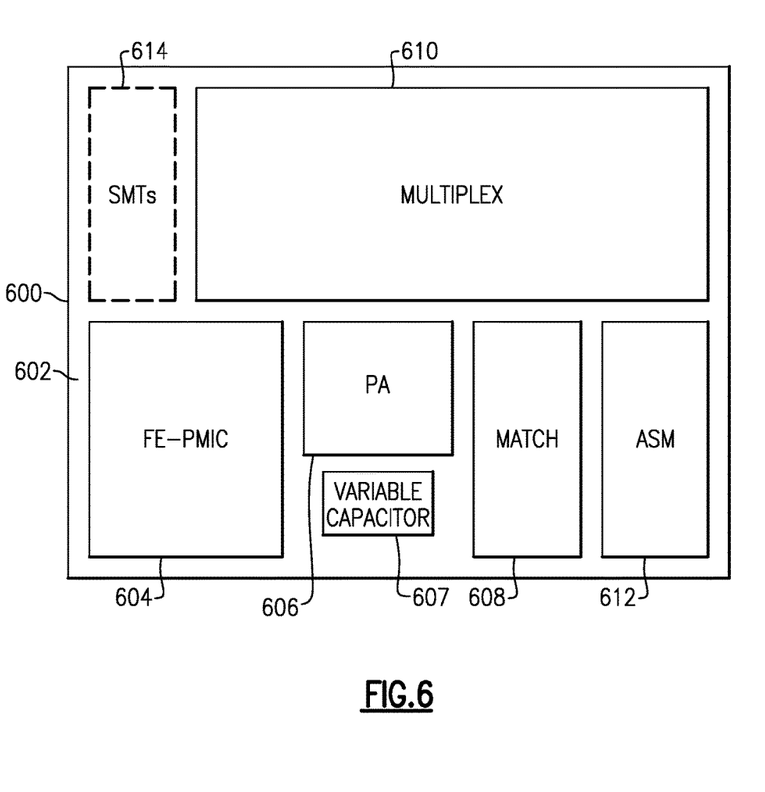
FIG. 6 depicts an example module having one or more advantageous features described herein.

FIG. 6 shows that in some embodiments, some or all of the variable capacitor configurations (e.g., those shown in FIGS. 1, 2A-2B, 4 and 5) can be implemented, wholly or partially, in a module. Such a module can be, for example, a front-end module (FEM). In the example of FIG. 6, a module 600 can include a packaging substrate 602, and a number of components can be mounted on such a packaging substrate 602. For example, an FE-PMIC component 604, a power amplifier assembly 606, a match component 608, and a multiplexer assembly 610 can be mounted and/or implemented on and/or within the packaging substrate 602. Other components such as a number of SMT devices 614 and an antenna switch module (ASM) 612 can also be mounted on the packaging substrate 602. A variable capacitor system 607 can also be mounted on the packaging substrate 602. Although all of the various components are depicted as being laid out on the packaging substrate 602, it will be understood that some component(s) can be implemented over or as part of other component(s).

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 7:
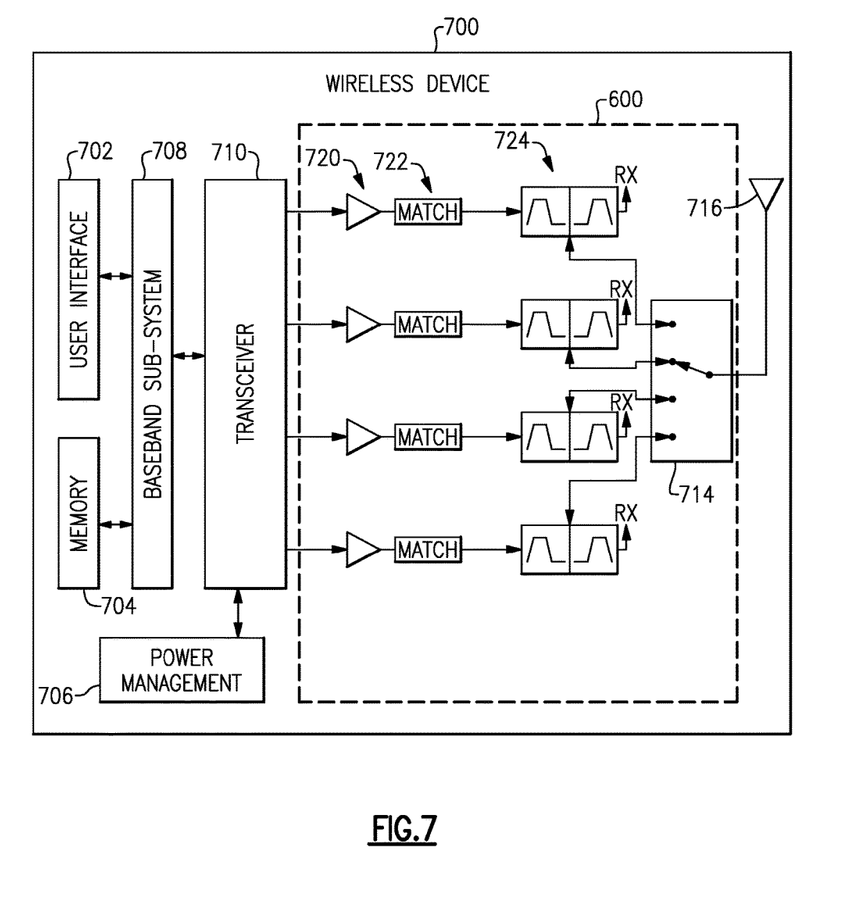
FIG. 7 depicts an example wireless device having one or more advantageous features described herein.

FIG. 7 depicts an example wireless device 700 having one or more advantageous features described herein. In the context of a module having one or more features as described herein, such a module can be generally depicted by a dashed box 600, and can be implemented as, for example, a front-end module (FEM).

Referring to FIG. 7, power amplifiers (PAs) 720 can receive their respective RF signals from a transceiver 710 that can be configured and operated in known manners to generate RF signals to be amplified and transmitted, and to process received signals. The transceiver 710 is shown to interact with a baseband sub-system 708 that is configured to provide conversion between data and/or voice signals suitable for a user and RF signals suitable for the transceiver 710. The transceiver 710 can also be in communication with a power management component 706 that is configured to manage power for the operation of the wireless device 700. Such power management can also control operations of the baseband sub-system 708 and the module 600.

The baseband sub-system 708 is shown to be connected to a user interface 702 to facilitate various input and output of voice and/or data provided to and received from the user. The baseband sub-system 708 can also be connected to a memory 704 that is configured to store data and/or instructions to facilitate the operation of the wireless device, and/or to provide storage of information for the user.

In the example wireless device 700, outputs of the PAs 720 are shown to be matched (via respective match circuits 722) and routed to their respective diplexers 724. Such amplified and filtered signals can be routed to an antenna 716 (or multiple antennas) through an antenna switch 714 for transmission. In some embodiments, the diplexers 724 can allow transmit and receive operations to be performed simultaneously using a common antenna (e.g., 716). In FIG. 7, received signals are shown to be routed to "Rx" paths (not shown) that can include, for example, a low-noise amplifier (LNA).

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A variable capacitor having a variable capacitance between a first node and a second node, the variable capacitor comprising:
   a switch having a first terminal and a second terminal, an impedance between the first terminal and the second terminal being controllable via a first control node, the switch including two or more transistors;
   a first capacitor coupled between the first terminal and the first node; and
   a second capacitor coupled between the second terminal and the second node.

2. The variable capacitor of claim 1 wherein the switch includes a first transistor having a source coupled to the first terminal and a drain coupled to a source of a second transistor of the switch, the second transistor having a drain coupled to the second terminal.

3. The variable capacitor of claim 2 wherein the control node is coupled to a gate of the first transistor.

4. The variable capacitor of claim 3 wherein the control node is coupled to the gate via a first resistor.

5. The variable capacitor of claim 3 wherein the control node is coupled to the source and the drain of the first transistor via an inverter.

6. The variable capacitor of claim 5 wherein the control node is coupled to the source of the first transistor via a second resistor and is coupled to the drain of the first transistor via a third resistor.

7. The variable capacitor of claim 2 wherein the first transistor includes a field-effect transistor (FET).

8. The variable capacitor of claim 1 wherein a maximum capacitance of the variable capacitor is at least six times a minimum capacitance of the variable capacitor.

9. The variable capacitor of claim 1 wherein a first capacitance of the first capacitor is substantially equal to a second capacitance of the second capacitor.

10. The variable capacitor of claim 1 further comprising an offset capacitor coupled between the first node and the second node.

11. The variable capacitor of claim 1 further comprising:
   a second switch having a third terminal and a fourth terminal, an impedance between the third terminal and the fourth terminal being controllable via a second control node;
   a third capacitor coupled between the third terminal and the first node; and
   a fourth capacitor coupled between the fourth terminal and the second node.

12. The variable capacitor of claim 11 wherein the variable capacitance is a substantially linear function of a control word applied to the first control node and second control node.

13. The variable capacitor of claim 1 wherein the switch has a first impedance in an on state in response to a high voltage at the control node and a second impedance in an off state in response to a low voltage at the control node, the first impedance being substantially resistive and the second impedance being substantially a parasitic capacitance.

14. The variable capacitor of claim 1 wherein the switch, first capacitor, and second capacitor are implemented on a single die.

15. A variable capacitor module comprising:
   a packaging substrate configured to receive a plurality of components; and
   a variable capacitor implemented on the packaging substrate, the variable capacitor having a variable capacitance between a first node and a second node, the variable capacitor including a switch having a first terminal and a second terminal, the switch including two or more transistors, an impedance between the first terminal and the second terminal being controllable via a first control node, the variable capacitor further including a first capacitor coupled between the first terminal and the first node and a second capacitor coupled between the second terminal and the second node.

16. The variable capacitor module of claim 15 wherein the variable capacitor module is a symmetric module with respect to the first node and the second node.

17. The variable capacitor module of claim 15 wherein the variable capacitance is a substantially linear function of a control word applied to the control node.

18. The variable capacitor module of claim 15 wherein the variable capacity further comprises a supply node configured to receive a supply voltage.

19. A wireless device comprising:
   a transceiver configured to generate a radio-frequency (RF) signal;
   a front-end module (FEM) in communication with the transceiver, the FEM including a packaging substrate configured to receive a plurality of components, the FEM further including a variable capacitor implemented on the packaging substrate, the variable capacitor having a variable capacitance between a first node and a second node, the variable capacitor including a switch having a first terminal and a second terminal, the switch including two or more transistors, an impedance between the first terminal and the second terminal being controllable via a first control node, the variable capacitor further including a first capacitor coupled between the first terminal and the first node and a second capacitor coupled between the second terminal and the second node; and
   an antenna in communication with the FEM, the antenna configured to transmit an amplified version of the RF signal received from a transmitter system.

20. The wireless device of claim 19 further comprising a controller configured to control the switch.

* * * * *